UNITED STATES PATENT OFFICE.

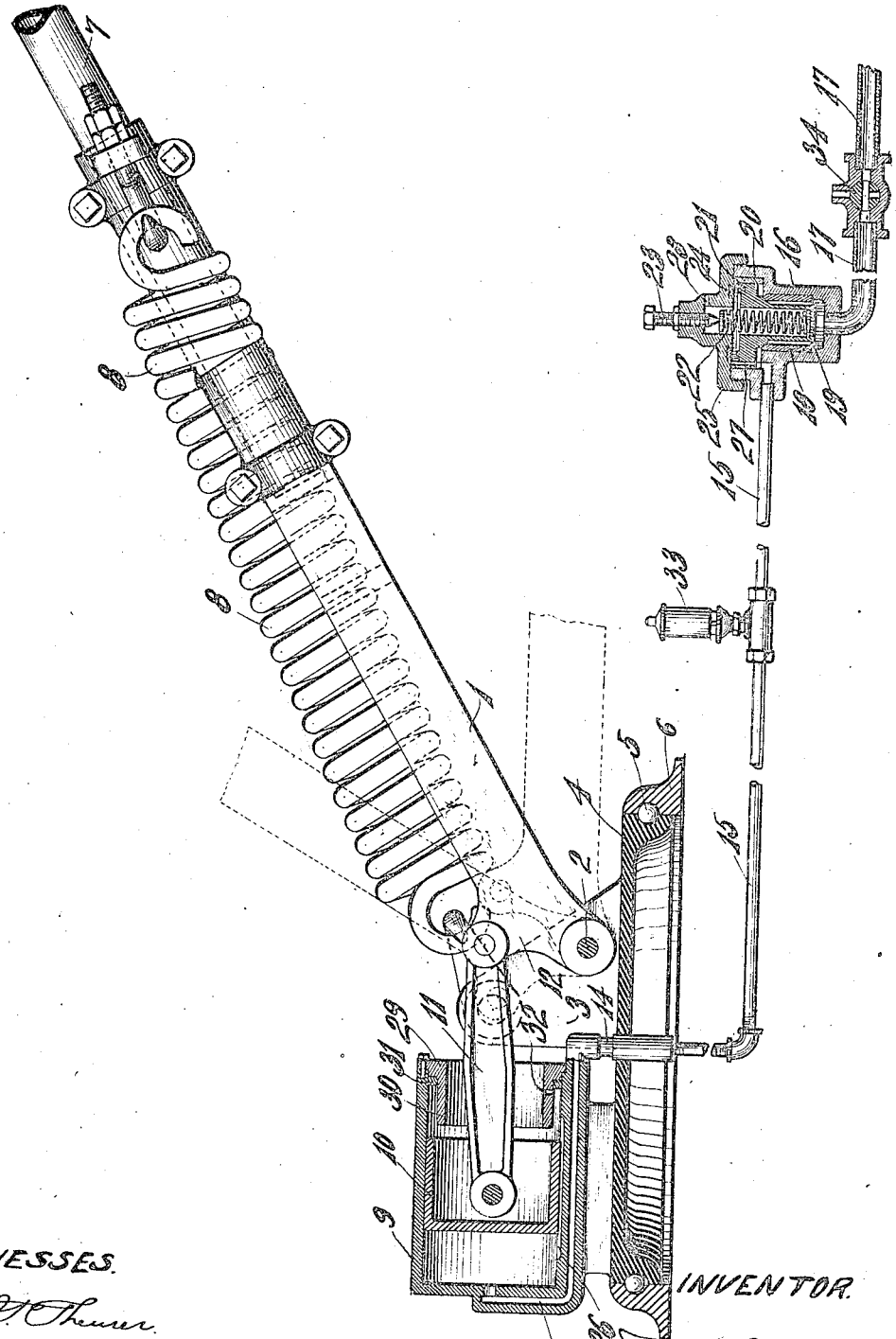

FRANK A. WASSON, OF MILWAUKEE, WISCONSIN.

TROLLEY-RETRIEVER.

1,143,002.   Specification of Letters Patent.   Patented June 15, 1915.

Application filed November 21, 1912. Serial No. 732,658.

*To all whom it may concern:*

Be it known that I, FRANK A. WASSON, a citizen of the United States, and resident of Milwaukee, in the county of Milwaukee and State of Wisconsin, have invented new and useful Improvements in Trolley-Retrievers, of which the following is a description, reference being had to the accompanying drawings, which are a part of this specification.

This invention has for its object to provide means for automatically lowering an electric railway trolley to a position where it will produce no injury to the overhead structure in the event of the trolley leaving the trolley wire. It is necessary that the trolley wheel be held firmly against the trolley wire and in order to maintain a proper electrical connection therewith and that the trolley be permitted to have a swinging movement in order that it may maintain such connection notwithstanding the variation in the elevation of the trolley wire owing to its distant points of suspension. When the trolley wheel leaves the wire it swings upwardly with force and unless immediately retracted is liable to cause damage to the overhead structure or receive injury therefrom.

The present invention is designed to utilize compressed air from the usual air brake system or from another source for automatically retracting the trolley when it makes a sudden upward movement on leaving the wire, without interfering with the slower swinging movements of the trolley in maintaining its connection with the wire.

With the above and other objects in view the invention consists in the trolley retriever as herein claimed and all equivalents.

In the accompanying drawings which represent a sectional elevation of a trolley constructed in accordance with this invention but having the upper end removed, 1 indicates the trolley frame which is pivotally mounted at 2 between upstanding brackets 3 on a rotatable base 4 which has a ball bearing connection 5 within a ring 6 adapted to be fastened to the roof of the car. The pole 7 carrying the usual trolley wheel, not shown, is secured to the upper end of the frame 1 and coil springs 8 connect the upper end of the frame with the upper ends of brackets 3 for holding the trolley in its engagement with the wire.

A cylinder 9 is mounted on the trolley base 4 and contains a piston 10 with its connecting rod 11 connecting with a lug 12 on the frame 1 at a short distance above the pivotal connection 2. The swinging movements of the trolley on the pivotal connection 2 cause reciprocating movements of the piston within the cylinder.

A passageway 13 leads from the closed end of the cylinder 9 and communicates with the swiveled pipe connection 14 at the center of the trolley base 4 which has a pipe 15 leading therefrom to the casing 16 of an automatic valve. This casing forms coaxial cylindrical chambers of different diameters, the lower chamber being the smaller and having a pipe 17 from the compressed air reservoir of an air-brake system or other supply connected therewith.

A bushing 18 forming a tapering valve seat at its upper end is fitted within the smaller chamber of the valve casing against a shoulder 19 and a bushing 20 forms a removable lining for the larger chamber of the valve casing.

A valve member 21 fits within the bushing 20 at its upper end and its lower end of smaller diameter freely passes through the bushing 18 while its conical intermediate portion fits upon the valve seat of bushing 18 to close the passageway through the valve casing. The valve is held in its lower seated position by the pressure of a spring 22 contained therein and engaged at its upper end by a set screw 23.

A gasket 24 let into the bottom of the screw cap 25 of the valve casing forms a seat for an annular flange on the top of the valve member to prevent the leakage of air past the valve when the valve is in its upper position.

The pressure of spring 22 under the adjustment of the set screw 23 is such that the pressure conveyed to the lower end of the valve casing from the compressed air reservoir by pipe 17 is insufficient to lift the valve off of its conical seat and consequently atmospheric pressure only is contained within the pipe 15 and the cylinder. The slight variations in pressure due to the slow reciprocating movements of the piston from the ordinary changes in elevation of the trolley wire are insufficient to produce a change in position of the automatic valve, for the cylinder is provided with one or more grooves 26 to permit the slow leakage of air around the piston and the automatic valve itself is provided with a leakway consisting of a groove 27 in bushing 20 and an outlet opening 28 in the cap of the valve casing. When, however, the piston 10 is given a quick movement in the cylinder, due to the trolley leaving the wire and moving toward the position shown by the upper dotted lines these bleed passageways are insufficient to relieve the pressure in the cylinder incident thereto and such pressure acting upon the lower face of the upper portion of the valve member is sufficient with the assistance of the pressure from the pressure reservoir to lift the valve and hold it tightly against its gasket 24 against the leakage of pressure therearound. This opening of the valve, however, admits the high pressure air from the compressed air reservoir to the cylinder through pipe 15 and its action upon the piston 10 is to immediately lower the trolley to the position shown in the lower dotted lines.

The open end of the cylinder is provided with a ring 29 with an annular flange 30 extending within the cylinder to fit the inner wall of the piston and form between it and the wall of the cylinder a pocket or dashpot to cushion the outward movement of the piston and prevent the trolley being thrown with force against the car roof.

A rubber or other gasket 31 may be located at the end of the dashpot to be engaged by the edge of the piston and a bleed opening 32 may be formed in the flange 30 to permit a slow escape of air from the dashpot.

It is desirable though not necessary to provide a signal means which will be operated by the compressed air on the opening of the automatic valve and I have shown such a means in the form of a whistle 33 in the pipe connection 15 which will sound an alarm as long as the automatic valve is open.

In order that the trolley may be released from its lower position in which it is forced and held by the compressed air in the cylinder a three-way cock 34 is provided in the compressed air supply pipe 17 and by means thereof the supply of compressed air to the automatic valve may be shut off and the valve casing opened to the atmosphere. This permits of the exhaust of the compressed air in the valve casing and the cylinder, permitting the springs 8 to restore the trolley to its normal condition and permitting the spring 23 to return the automatic valve to its seated position. After the automatic valve is seated the three-way cock 34 is returned to its normal position as shown and the device is again ready for operation.

By means of this invention the trolley is withdrawn quickly through automatic means actuated by the quick upward movement of the trolley when it leaves the wire and its downward movement while forcible is sufficiently cushioned to prevent its doing injury to the car.

While the device is operated by compressed air there is no waste of air pressure as the air from the reservoir is only admitted to the cylinder when the trolley leaves the wire.

What I claim as new and desire to secure by Letters Patent is:

1. In a trolley retriever, an automatic valve comprising a casing containing a valve seat, a spring pressed valve member seated therein and provided with separate pressure areas on opposite sides of the valve seat but on the same side of the valve member, a compressed air supply means having communication with one pressure area of the valve member, and a trolley swinging motor having communication with the other pressure area of the valve member.

2. In a trolley retriever, an automatic valve for controlling the supply of pressure fluid to a trolley swinging motor, comprising a casing forming a valve chamber with a valve seat between its upper portion and its lower portion, a valve member contained within the valve chamber and fitting the upper portion thereof and adapted to be seated on the valve seat, a fluid pressure supply means connected with the casing beneath the valve seat, a pipe connection for the trolley swinging motor connecting with the casing between the valve seat and the upper end of the valve, and a spring holding the valve member on its seat with sufficient pressure to withstand the pressure from the pressure fluid supply means acting on the area of the valve within the valve seat but capable of being overcome by such pressure when augmented by pressure beneath the upper end of the valve member from the trolley swinging motor when the trolley leaves the trolley wire.

3. In a trolley retriever, an automatic valve for controlling the supply of pressure fluid to a trolley swinging motor, comprising a casing forming a valve chamber with a valve seat between its upper portion and its lower portion, a valve member contained within the valve chamber and fitting the upper portion thereof and adapted to be seated on the valve seat, a fluid pressure supply means connected with the casing beneath the valve seat, a pipe connection for the trolley swinging motor connecting with the casing between the valve seat and the upper end of the valve, a spring holding the valve member on its seat with sufficient pressure to withstand the pressure from the pressure fluid supply, means acting on the area of the valve within the valve seat but capable of being overcome by such pressure when augmented by pressure beneath the upper end of the valve member from the trolley swinging motor when the trolley leaves the trolley wire, there being a vent passageway around the portion of the valve member which fits the valve casing and through the upper part of the valve casing above the valve member, a flange on the valve member, and a gasket in the valve casing engaged by the flange for closing the vent passageway when the valve is in its open position.

4. In a trolley retriever, an automatic valve for controlling the supply of pressure fluid to a trolley swinging motor, comprising a casing forming a valve chamber with its upper portion of larger diameter than its lower portion, a bushing fitting within the lower portion of the valve chamber and forming at its lower end a tapering valve seat, a bushing within the upper portion of the valve casing, a hollow valve member having its lower portion of smaller diameter than its upper portion and loosely fitting within the valve seat bushing and its upper portion fitting within the other bushing and provided with a tapering intermediate portion adapted to be seated on the valve seat, a fluid pressure supply means connected with the casing beneath the valve seat, a pipe connection for the trolley swinging motor connecting with the casing between the valve seat and the upper end of the valve, a spring within the valve, a set screw in the top of the valve casing engaging the spring and adapted to adjust the pressure thereof, said spring holding the valve member on its seat with sufficient pressure to withstand the pressure from the pressure fluid supply means acting on the area of the valve within the valve seat but capable of being overcome by less pressure when augmented by pressure beneath the upper end of the valve member from the trolley swinging motor when the trolley leaves the trolley wire, there being a groove in the bushing at the upper end of the valve casing forming a vent passageway around the portion of the valve member fitting within said bushing and a vent opening in the top of the valve casing, a flange on the upper end of the valve member, and a gasket on the valve casing engaged by the flange for closing communication between the groove and the vent opening when the valve is in its open position.

In testimony whereof, I affix my signature, in presence of two witnesses.

FRANK A. WASSON.

Witnesses:
R. S. C. CALDWELL,
KATHERINE HOLT.